United States Patent
Nobutoki et al.

[11] Patent Number: 5,596,588
[45] Date of Patent: Jan. 21, 1997

[54] MULTIPLEX TRANSMISSION METHOD

[75] Inventors: Yoshikazu Nobutoki, Higashihiroshima; Masao Hideshima, Hiroshima; Shigeyuki Satomura, Kure; Akira Sone, Hiroshima, all of Japan

[73] Assignee: Mazda Motor Corporation, Hiroshima, Japan

[21] Appl. No.: 858,538

[22] Filed: Mar. 27, 1992

[30] Foreign Application Priority Data

Mar. 28, 1991 [JP] Japan ............................. 3-064282

[51] Int. Cl.$^6$ .............................. G08C 25/02; H04L 1/18
[52] U.S. Cl. .................................... 371/32; 371/33
[58] Field of Search .............................. 371/32, 35, 53, 371/33, 34; 370/77

[56] References Cited

U.S. PATENT DOCUMENTS

| | | | |
|---|---|---|---|
| 4,507,782 | 3/1985 | Kunimasa et al. | 371/32 |
| 4,908,828 | 3/1990 | Tikalsky | 371/32 |
| 4,939,731 | 7/1990 | Reed et al. | 371/32 |
| 4,970,714 | 11/1990 | Chen et al. | 371/32 |
| 5,036,518 | 7/1991 | Tseung | 371/32 |
| 5,191,326 | 3/1993 | Montgomery | 340/855.5 |
| 5,251,214 | 10/1993 | Mertens et al. | 371/53 |

FOREIGN PATENT DOCUMENTS 61-224534A 10/1986 Japan.

*Primary Examiner*—Paul P. Gordon

[57] ABSTRACT

A multiplex transmission method in which time-divisional multiplex transmission operations are performed among a plurality of communication nodes, and every time a node transmits a new signal, it changes the state of a re-transmission check bit added to the signal. When a signal is re-transmitted, each node sets the re-transmission check bit to be the same as that of the new signal to be re-transmitted. Each node can properly determine whether or not a reception signal is a new or re-transmission signal for the self node.

8 Claims, 5 Drawing Sheets

MULTIPLEX TRANSMISSION METHOD

BACKGROUND OF THE INVENTION

1. Field of the Invention

The present invention relates to a multiplex transmission method used in, e.g., a vehicle and, more particularly, to a multiplex transmission method for, when a transmitted new signal frame is not normally received, re-transmitting the new signal frame.

2. Description of the Related Art

In recent vehicles, the number of electronic devices equipped in a vehicle is considerably increased along with the development of electronic control, and this results in an increase in the number of wiring lines for connecting the electronic devices, and a complicated wiring structure. In order to solve these problems, as disclosed in, e.g., Japanese Laid-Open Patent Application No. 61-224534, a multiplex transmission method has been examined, and is beginning to be put into practical applications. In this method, signal transmission operations among a plurality of electronic devices are performed in a multiplex transmission mode, i.e., communication nodes of the plurality of electronic devices are connected to a common transmission path, and signal transmission operations among the communication nodes are performed in the multiplex transmission mode.

In the above-mentioned multiplex transmission method, when each communication node transmits a signal frame for informing its own information, it checks if the signal frame is normally received. If the communication node determines that any of nodes to receive the signal frame did not normally receive the signal frame, it re-transmits the signal frame.

When the signal frame is re-transmitted, as described above, if information in the signal frame is merely information for controlling an ON/OFF state of a switch, no problem is particularly posed. However, if the information is percent control information for, e.g., decreasing an engine output by 50%, a reception node must check if the signal frame is a new frame, which has not been received by the self node yet, or is a re-transmitted one of the already received frame.

When the information in the signal frame instructs to decrease an engine output by 50%, one of a plurality of nodes, which must receive the signal frame, is an EGI node having an EGI controller for controlling an engine, and the signal frame is normally received by the EGI node but is not normally received by another node, the following drawback occurs. More specifically, if the EGI node cannot detect that the re-transmitted signal frame is a re-transmitted one of the already received frame, it receives the re-transmitted frame as a new frame, which is not received yet, and decreases an engine output by another 50%. As a result, the engine output is decreased to 25%.

SUMMARY OF THE INVENTION

The present invention has been made in consideration of the above situation, and has as its object to provide a multiplex transmission method, in which a reception node can very easily check if a received signal frame is a new or re-transmitted frame.

In order to achieve the above object, according to the present invention, a multiplex transmission method for performing time-divisional distributed multiplex transmission operations among a plurality of nodes, comprises the steps of: detecting that the communication node did not normally receive a signal transmitted from another communication node; adding a check bit indicating that the signal is a re-transmitted signal to the signal upon reception of the detection result; and re-transmitting the signal added with the check bit.

Preferably, every time a new signal is transmitted, the check bit undergoes a predetermined change, and when the signal is re-transmitted, the check bit is not changed.

Preferably, it is determined based on the content of a reception acknowledge signal that the communication node did not normally receive a signal transmitted from another communication node.

Preferably, a transmission signal from each communication node is added with a code representing a priority order for the multiplex transmission operation, and when the code undergoes a predetermined change after the signal is transmitted, it is determined that the transmission signal from a communication node having a low priority order was not normally received.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

The preferred embodiment of the present invention will now be described with reference to the accompanying drawings. The embodiment to be described below employs a network access method called a CSMA/CD-AMP system, as a multiplex transmission method for a vehicle. The CSMA (Carrier Sense Multiple Access) means a system wherein each communication node confirms a ready state of a transmission path upon generation of a transmission request, and performs transmission, and the CD (Collision Detection) is a system wherein each communication node monitors transmission signals on a transmission path, and performs re-transmission control upon detection of collision of signals. The AMP (Arbitration on Message Priority) means a system wherein a message having a high priority is transmitted without being destroyed upon collision of signals.

<Multiplex Transmission Apparatus>

Figure 1:
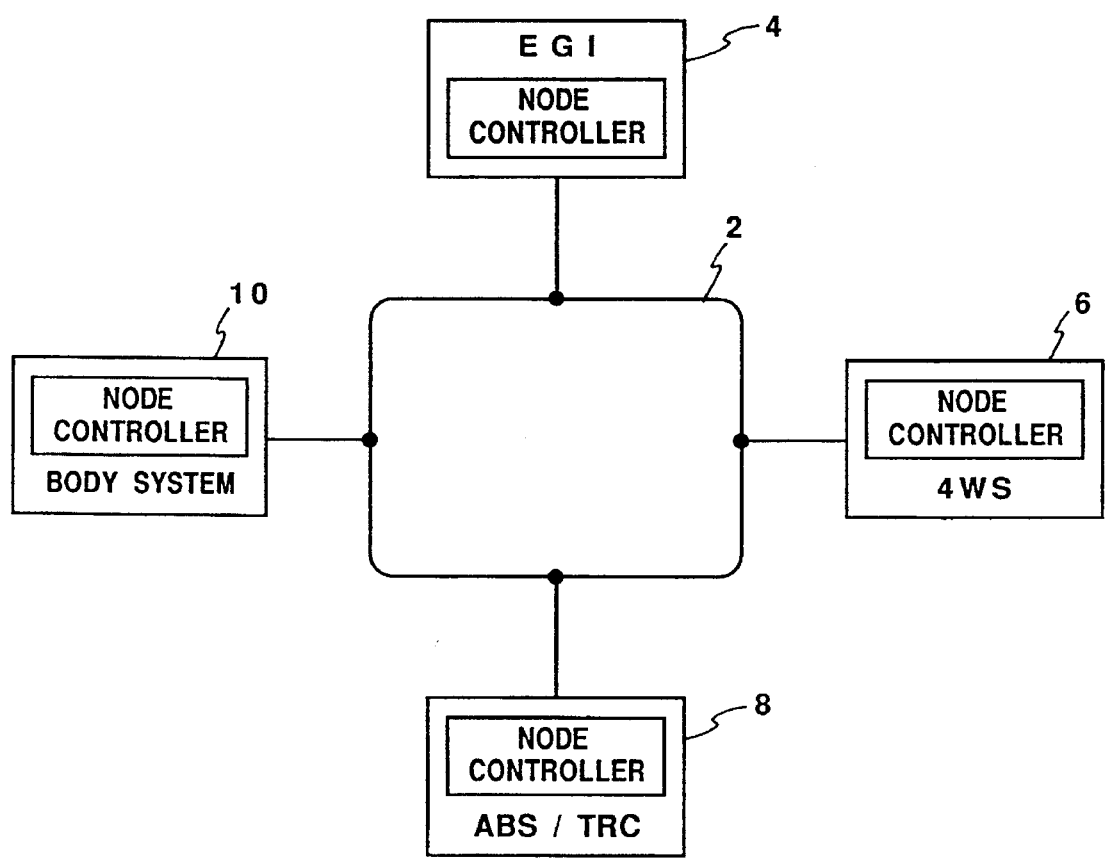
FIG. 1 is a schematic block diagram of a multiplex transmission apparatus according to an embodiment of the present invention.

FIG. 1 is a schematic block diagram showing the arrangement of a multiplex transmission apparatus according to the preferred embodiment. The apparatus shown in FIG. 1 has a common transmission path (bus) 2 comprising loop-like twisted pair lines. The transmission path 2 is connected to four multiplex communication nodes. The four communication nodes include an EGI node 4 having an EGI controller for performing engine control, a 4WS node 6 having a 4WS controller for performing four-wheel steering control, an ABS/TRC node 8 having an ABS/TRC controller for performing slip control of wheels, and a body-system node 10 having a controller for controlling switches associated with a body.

Signal transmission operations among the communication nodes 4, 6, 8, and 10 are performed via the transmission path 2 in a multiplex transmission mode based on a time-divisional distributed control system, and the above-mentioned CSMA/CD-AMP system. A signal transmitted from one node is sent to be received by all the nodes. Therefore, when a given node performs a signal transmission operation, all the nodes are reception nodes, and when one of the nodes cannot normally receive a signal, a re-transmission operation is performed.

<Signal Frame>

Figure 2:
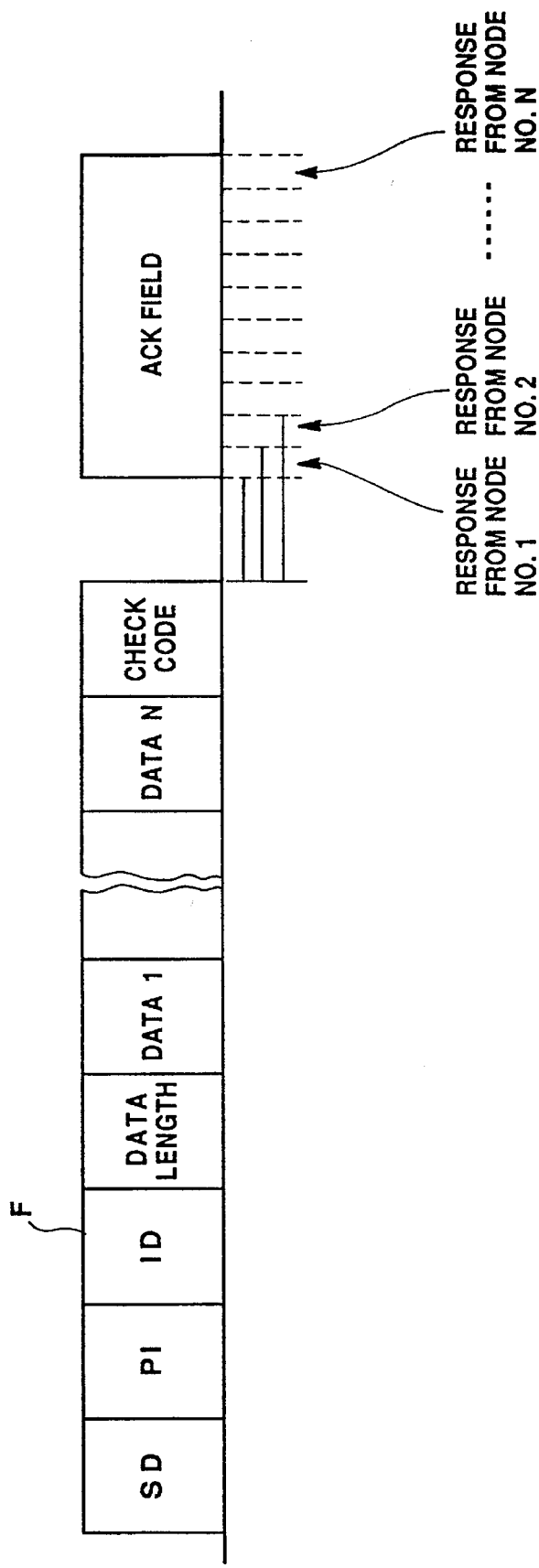
FIG. 2 is a view showing a signal frame.

In the above-mentioned signal transmission operation, each of the communication nodes 4, 6, 8, and 10 transmits information of its own node, e.g., various pieces of vehicle drive information or control information using a signal frame F having a format shown in FIG. 2 in units of frames, and the remaining nodes receive the frame F. The frame F has an SD code, a PI code, an ID code, a data length, data 1 to data N, and a check code.

The "SD (Start Delimiter) code" is a specific code representing the start of the frame F. Upon reception of the SD code, each node can recognize the start of the frame F. The "PI (priority) code" is a code indicating a priority order for instructing a signal to be preferentially processed when a plurality of communication nodes simultaneously transmit data, and signals collide against each other. In this embodiment, a lower bit value indicates a higher priority. This is because a low level corresponds to WIRED-OR in the transmission path 2.

If signals are simultaneously transmitted from a plurality of nodes, the "PI code" of a node having a high priority remains on the transmission path 2. For this reason, a node having a low priority detects collision since its own "PI code" is replaced with another code, and re-transmits its own unsuccessful frame.

The "ID (frame ID) code" is a code indicating a transmission source of the corresponding frame. The "data length" is written with the number of following data. For example, if N data follow, N is sent as the data length. A node, which received the frame F, reads the data content by only the data length. The "data 1 to data N" are written with various pieces of information to be transmitted in the frame F.

Figure 3:
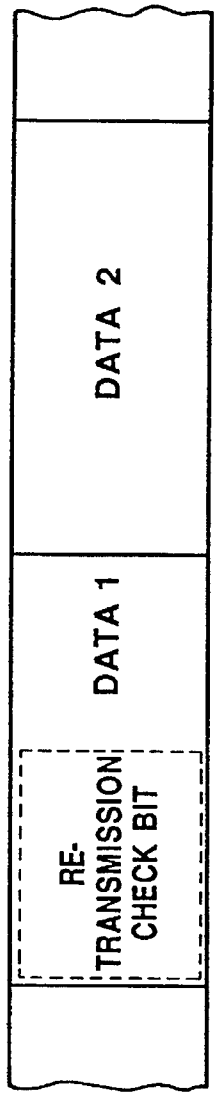
FIG. 3 is a view showing the position of a re-transmission check bit.

A re-transmission check bit is provided in a first portion of the data 1, as shown in FIG. 3. The re-transmission check bit need not always be provided in the data 1 region, but may be arranged at any location in this frame format. The re-transmission check bit will be described in detail later. A field following the data is the "check code" (CRC check code; error detection code). Upon reception of this code, a node can detect the end of the frame.

<ACK Field>

When each communication node transmits the signal frame F, it sends an "ACK field" (reception acknowledge signal field) onto the transmission path 2. This field consists of bits (4 bits since the four communication nodes are connected in this embodiment) corresponding in number to communication nodes connected to the transmission path 2, and a predetermined inherent bit region is assigned to each communication node. Each communication node acknowledges normal reception of the frame F using the corresponding bit region of the ACK field. More specifically, a communication node (transmission node), which transmits the signal frame, sets "0" in the corresponding bit region of the ACK field upon transmission of the signal frame, and sends it onto the transmission path after the signal frame.

On the other hand, a communication node (reception node), which receives this signal frame, checks if the contents of the data 1 to N in the received frame include an error. If no error is found, the reception node sets "1" in the corresponding inherent bit region, and transmits it as a reception acknowledge signal (ACK signal). In this case, the transmission node receives the ACK signal simultaneously with transmission of the signal frame F, and if it can normally receive the signal frame, it sets "1" in the bit region in the ACK field inherent to the transmission node.

Therefore, when the communication nodes normally receive the transmitted signal frame, all the bit regions of the ACK field on the transmission path 2 are set with "1". If any of reception nodes cannot normally receive the signal frame, the bit region inherent to this reception node remains to be "0". Therefore, the transmission node receives this ACK field to check if the reception nodes normally received the signal frame, and if the transmission node determines that any of the reception nodes did not receive the signal frame, it re-transmits the same signal frame.

When the signal frame is re-transmitted, the ACK field is transmitted after the signal field. With this field, when it is acknowledged that a node, which could not receive the signal frame previously, normally received the signal frame, the re-transmission operation is stopped. However, when it is acknowledged that the node cannot normally receive the signal frame yet, the re-transmission operation is performed again. When the node cannot normally receive the signal frame after three re-transmission operations, it is determined that the node is in a down state, and no more re-transmission is performed.

<Re-transmission Check Bit>

The re-transmission check bit shown in FIG. 3 consists of one bit, and is written with high (1) or low (0) level, as follows. More specifically, every time each transmission node transmits a signal frame (new frame), which is new for the transmission node, it alternately changes high and low levels of the re-transmission check bit of the signal frame like 0, 1, 0, 1, . . . . When a signal frame is re-transmitted, the re-transmission check bit of the signal frame to be re-transmitted (re-transmission frame) is set to be the same as the re-transmission check bit of a new frame to be re-transmitted. More specifically, if the re-transmission check bit of a new frame to be re-transmitted is 1, the re-transmission check bit of the re-transmission frame is similarly set to be 1; if it is 0, the bit is similarly set to be 0. Note that rewrite management of the re-transmission check bit is performed in units of transmission nodes.

Note that words "new" and "re-transmission" respectively mean "new" and "re-transmission" for a transmission node, and do not always coincide with "new" and "re-transmission" for a reception node.

The re-transmission check bit will be described in more detail below with reference to FIG. 4.

Assume that a given node sequentially transmits a new frame F1, a new frame F2, a new frame F3, a re-transmission frame F4 as re-transmission of the new frame F3, a new frame F5, a re-transmission frame F6 as re-transmission of the new frame F5, and a re-transmission frame F7 as re-transmission of the new frame F5. In this case, if the re-transmission check bit of the first new frame F1 is 0, it is rewritten with 1 in the frame F2 since the frame F2 is a new frame. The re-transmission check bit is then rewritten with 0 in the frame F3 since the frame F3 is also a new frame. However, the re-transmission check bit of the frame F4 is set to be the same as that of the frame F3, i.e., 0 since the frame F4 is a re-transmission frame of the frame F3. The re-transmission check bit of the frame F5 is rewritten with 1 since the frame 5 is a new frame. The re-transmission check bit of the frame F6 is set to be the same as that of the frame F5, i.e., 1 since the frame F6 is a re-transmission frame of the frame F5. Since the frame F7 is also a re-transmission frame of the frame F5, its re-transmission check bit is set to be the same as that of the frame F5, i.e., 1. In the above-mentioned case, the frame F7 may be processed as a re-transmission frame of the frame F6. In this case, the re-transmission check bit of the frame F7 is also set to be 1.

When the re-transmission check bit is set as described above, upon reception of a signal frame, each node checks a transmission source node of the signal frame, and compares the re-transmission check bit of a previously received signal frame transmitted from the same transmission node with the re-transmission check bit of the currently received signal frame. If the two bits are different from each other, it can be determined that the currently received signal frame is a new frame for the reception node; if the two bits are equal to each other, it can be determined that the currently received signal frame is a re-transmission frame of the already received previous frame.

Decision processing for determining whether a received frame is a new or re-transmission frame will be described in detail below with reference to FIG. 4 and the flow charts shown in FIGS. 5A and 5B.

Figure 4:
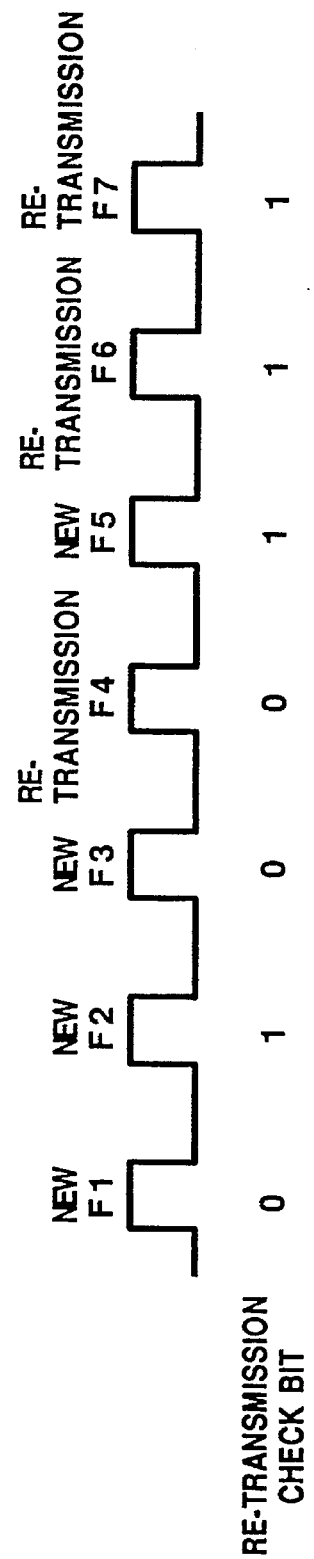
FIG. 4 is a view showing a change in re-transmission check bit.
Figure 5A:
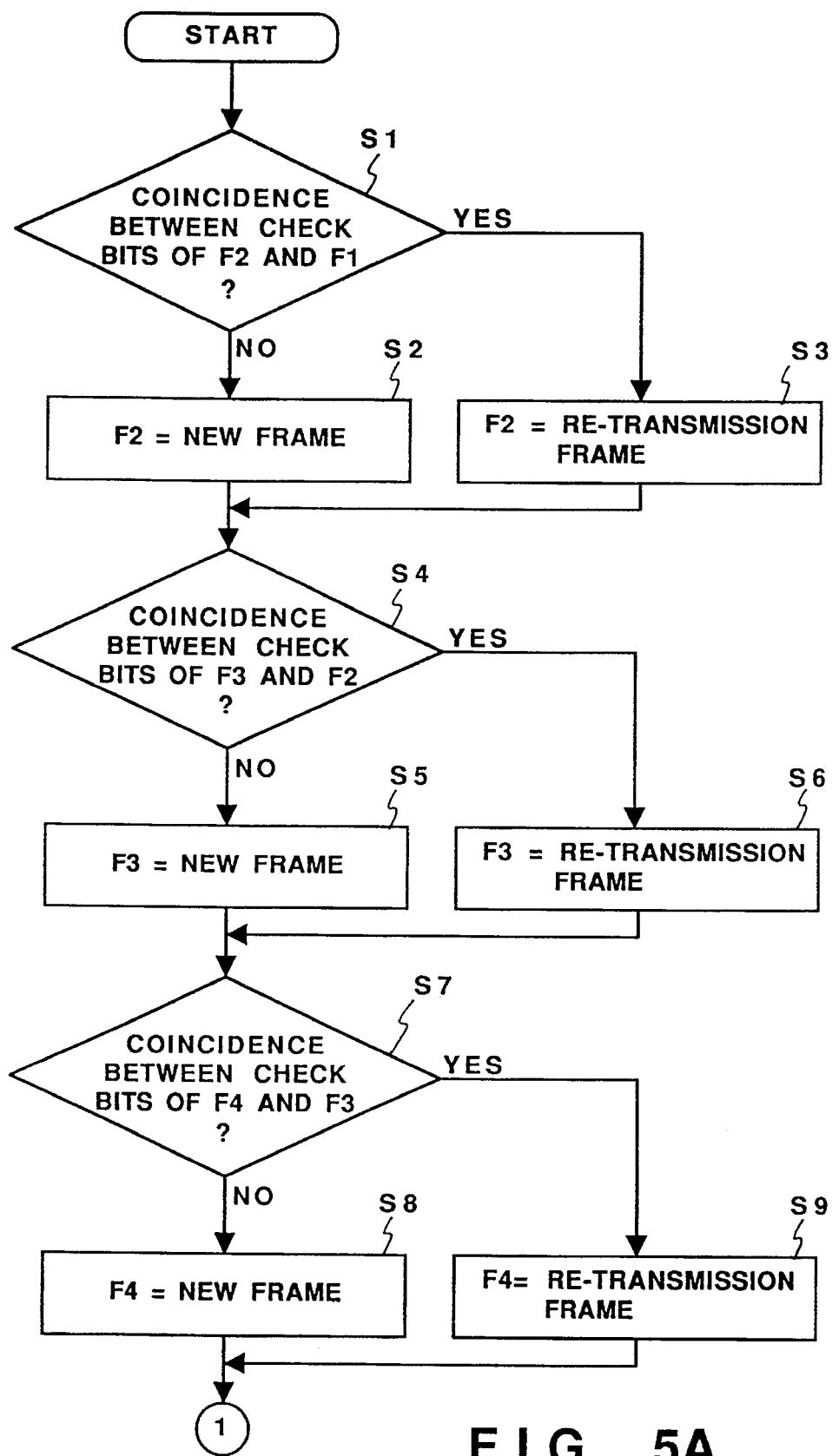
FIGS. 5A and 5B are flow charts showing a decision processing sequence of a received frame.
Figure 5B:
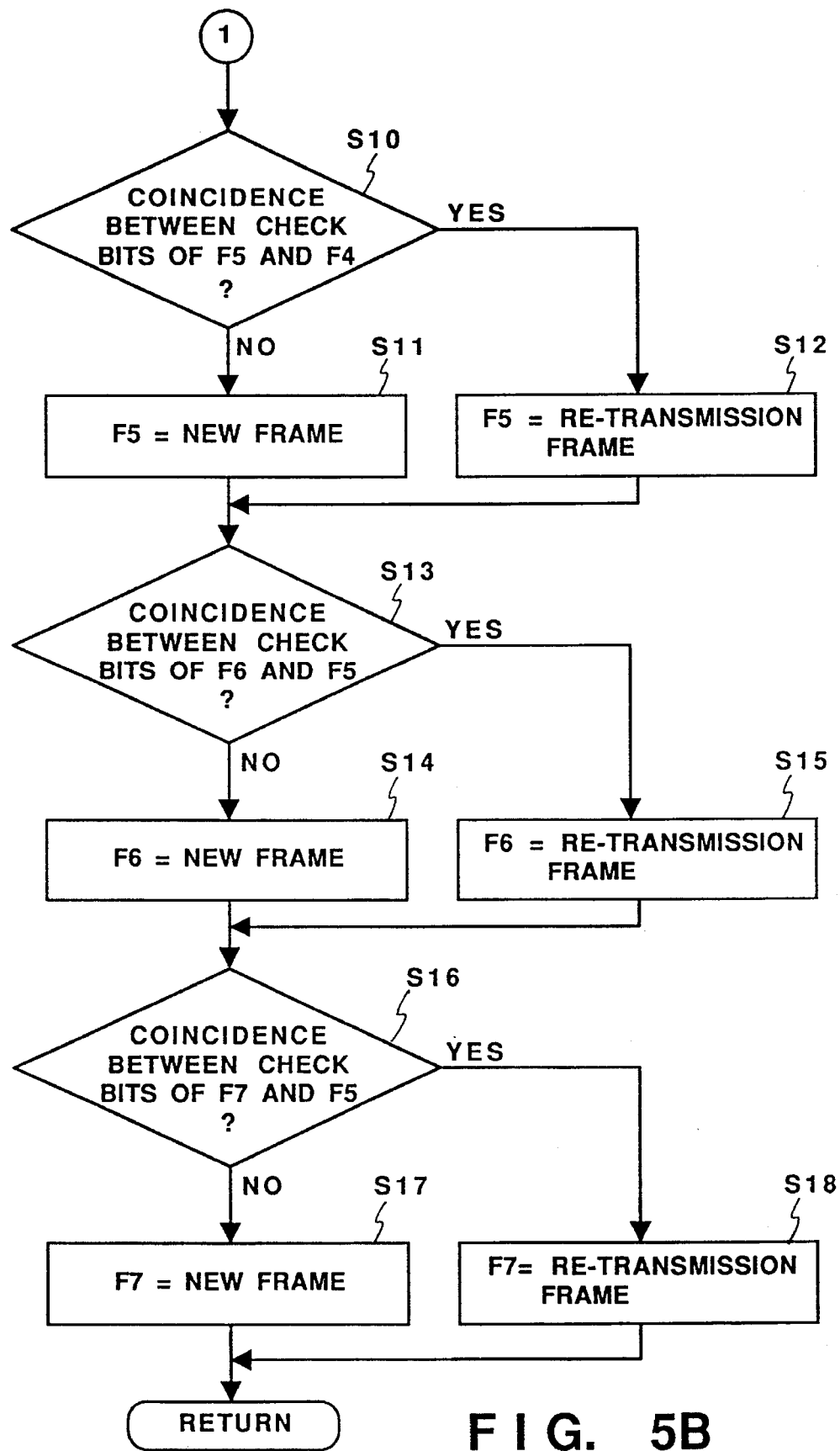

Assume that a given reception node normally receives all the signal frames F1 to F7 shown in FIG. 4. The reception node determines in step S1 in FIG. 5A that the re-transmission check bit of the frame F2 is different from that of the previously received frame F1, and then determines in step S3 that the frame F2 is a new frame. Similarly, the reception node determines that the frame F3 is a new frame since its re-transmission check bit is different from that of the frame F2 (steps S4 and S5). The node determines that the frame F4 is a re-transmission frame since its re-transmission check bit is equal to that of the frame F3 (steps S7 and S9). The node determines that the frame F5 is a new frame since its re-transmission check bit is different from that of the frame F4 (steps S10 and S11 in FIG. 5B). The node determines that the frame F6 is a re-transmission frame since its re-transmission check bit is equal to that of the frame F5 (steps S13 and S15). The node determines that the frame F7 is also a re-transmission frame since its re-transmission check bit is the same as that of the frame F5 (the previously received signal frame is F5 since the frame F6 is determined as a re-transmission frame, and is canceled) (steps S16 and S18). Note that the frame F6 may be processed as the previously received frame without being canceled, as described above. In this case, since the re-transmission check bit of the frame F7 is the same as that of the frame F6, the frame F7 can be determined as a re-transmission frame.

A case will be described below wherein a reception node cannot receive the frames F3, F5, and F6 in FIG. 4.

In this case, the frame F2 is determined as a new frame since its re-transmission check bit is different from that of the frame F1. The next received frame F4 is determined as a new frame since its re-transmission check bit is different from that of the previously received frame F2 (since the frame F3 is not received, the frame F4 is a new frame for this node). The next received frame F7 is determined as a new frame since its re-transmission check bit is different from that of the previously received frame F4.

As described above, according to the above-mentioned decision processing, any reception node can properly determine whether a received signal frame is a new or re-transmission frame for itself.

Each communication node is often temporarily set in an abnormal state such as a transmission/reception disabled state, i.e., a down state. If each communication node can determine its own normal/abnormal state, and can also determine normal/abnormal states of other nodes, whether a received frame is a new or re-transmission frame can be determined as follows when the node is recovered to a normal state.

More specifically, a given node (to be referred to as a "self node" hereinafter, and a node other than the "self node" will be referred to as "another node") will be examined below. In a down state of the "self node", if the "self node" determines by itself that it is recovered to a normal state, the "self node" sets a value (high or low level) of the re-transmission check bit of the first signal frame from "another node" as an initial value of the corresponding "another node", and determines the received frame as a new frame. In a down state of "another node", after the "self node" determines that the corresponding "another node" is recovered to a normal state, the "self node" sets the re-transmission check bit of a signal frame received first from the "another node" as an initial value of the "another node" and determines the received frame as a new frame.

As described above, when signal collision occurs, a frame having a lower priority is re-transmitted. In this case, a transmission frame upon collision may be considered as a new frame, and a re-transmission frame may be considered as re-transmission of the new frame. However, since the transmission frame upon collision is not transmitted all the way, the re-transmission frame may be considered as a new frame. In this case, the re-transmission check bit of a signal frame re-transmitted upon collision can have the same result.

The new/re-transmission frame decision processing according to this embodiment is very simple. That is, a 1-bit re-transmission check bit is simply provided to a signal frame, and every time a transmission node transmits a new frame, the re-transmission check bit is alternately rewritten with high and low levels. When the new frame is re-transmitted, the level of the new frame is maintained. In addition, when a new frame is transmitted, since each node forms the new frame, it is easy to change the re-transmission check bit. When a new frame is re-transmitted, since each node need only transmit the already formed signal frame, it need not rewrite a new signal frame to be re-transmitted. As a result, a load on a transmission node can be reduced, and the decision processing is very simple also from this point of view.

In the above embodiment, whether or not a transmission frame is normally received is acknowledged by the above-mentioned ACK field, but may be acknowledged by other methods, as a matter of course.

As many apparently widely different embodiments of the present invention can be made without departing from the spirit and scope thereof, it is to be understood that the invention is not limited to the specific embodiments thereof except as defined in the appended claims.

What is claimed is:

1. A multiplex transmission method for performing time-divisional distributed multiplex transmission operations among a plurality of communication nodes, comprising the steps of:

adding a check bit at a transmission node to a signal transmitted from said transmission node, said transmission node being one of said plurality of communication nodes and said check bit indicating a status of said signal;

causing said check bit to have a predetermined change every time a new signal is transmitted from said transmission node to a reception node which is one of said plurality of communication nodes, said predetermined change giving rise to a change of a value of said check bit which is different from a value of a check bit added to a previously transmitted signal;

detecting at said transmission node presence or absence of a communication node which has not normally received the signal transmitted from said transmission node, in said plurality of communication nodes;

re-transmitting the signal from said transmission node, without changing the status of said check bit, in accordance with a detection result obtained at said detecting step; and determining, at said reception node which has received said signal, whether said signal is a re-transmitted signal on a basis of a comparison result between a first status of a check bit associated with a previously received signal and a second status of a check bit associated with a currently received signal;

wherein if the first status and the second status agree, it is determined at said determining step that the received signal is the re-transmitted signal.

2. The method according to claim 1, wherein said detecting step includes determining that said reception node has not normally received a signal transmitted from said transmission node based on the content of a reception acknowledge signal.

3. The method according to claim 1, further comprising the steps of:

adding a code to a transmission signal from each of the plurality of communication nodes, said code representing a priority order for the multiplex transmission operations, and determining that a transmission signal from a communication node having a low priority has not normally been received when said code undergoes a predetermined change after a signal transmission.

4. The method according to claim 1, wherein said check bit is located at the head of a transmission signal.

5. The method according to claim 1, wherein a signal is continuously re-transmitted until the reception node normally receives the signal transmitted from said transmission node.

6. The method according to claim 1, wherein when it is detected that said reception node has not normally received said signal transmitted from said transmission node, re-transmission of said signal is executed a predetermined number of times, and thereafter, is stopped.

7. The method according to claim 1, further comprising the steps of:

said reception node determining a recovery from a transmission/reception disabled state; and determining that a signal received first from said transmission node after the recovery of said reception node from said disabled state is a new signal.

8. The method according to claim 1, further comprising the steps of:

said reception node determining a recovery by said transmission node from a transmission/reception disabled state; and determining that a signal received first from said transmission node after the recovery of said transmission node from said disabled state is a new signal.

* * * * *

UNITED STATES PATENT AND TRADEMARK OFFICE
CERTIFICATE OF CORRECTION

PATENT NO. : 5,596,588

DATED : January 21, 1997

INVENTOR(S) : Yoshikazu NOBUTOKI et al.

It is certified that error appears in the above-indentified patent and that said Letters Patent is hereby corrected as shown below:

Column 4, line 66, change "FS," to --F5,--.

Column 5, line 11, change "FS," to --F5,--.

Signed and Sealed this

Twentieth Day of May, 1997

Attest:

BRUCE LEHMAN

Attesting Officer     Commissioner of Patents and Trademarks